May 6, 1958 R. E. SCOTT 2,833,011
FASTENER CLIP
Filed Aug. 1, 1955
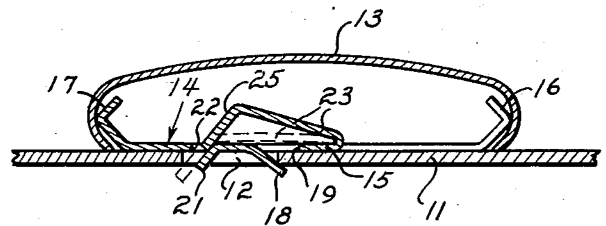
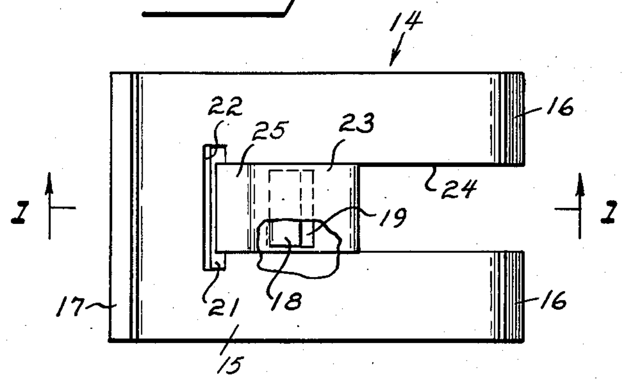
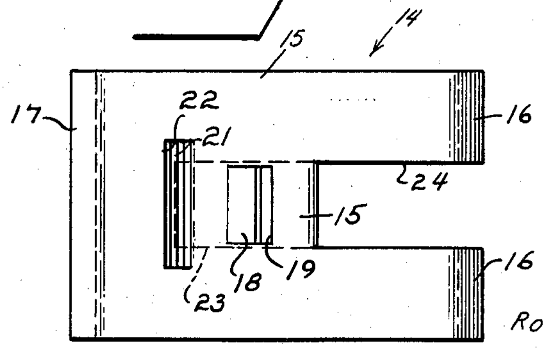
INVENTOR
ROBERT E. SCOTT
BY Strauch, Nolan + Diggins
ATTORNEYS United States Patent Office 2,833,011

Patented May 6, 1958

2,833,011

FASTENER CLIP

Robert E. Scott, Southfield Township, Oakland County, Mich., assignor to Gagnier Fibre Products Company, Oak Park, Mich., a corporation of Michigan Application August 1, 1955, Serial No. 525,638

9 Claims. (Cl. 24—73)

This invention relates to fasteners and particularly one-piece mounting clips of the type that are peculiarly adapted to mounting molding and like strips upon automobile side and like metal panels.

The invention will be described in its preferred embodiment as clips to be used in mounting decorative and covering molding strips upon automobile body panels. In practice the panels are stamped with circular holes having a predetermined linear spacing and the mounting clip vendors are required to supply clips that will attach into these holes and are formed with molding strip support means. The molding strips are generally channel shaped and the fastener clip is usually frictionally slidably associated with the channel so as to be adjustable lengthwise of the molding to suit the panel hole spacing regardless of the accuracy of hole location and to permit longitudinal sliding of the molding as for removal and repair.

The present molding clip embodies a molding channel engaging and supporting portion which may be of any suitable shape to suit the molding to be mounted and a special panel fastener portion for entering and interlocking with the hole in the panel. Molding clips of this general type have been heretofore proposed but that of the invention hereinafter described in detail embodies a panel hole engaging fastener portion of novel simple structure that may be expanded into interlock with the panel hole from a point externally of the body panel whereas most of those in use today require the fastener portion to be locked from within the body panel.

It is therefore a major object of the invention to provied a molding or like mounting clip having a novel fastener portion that is inserted into a panel hole and then interlocked without the use of special tools.

A further object of the invention is to provide a novel molding or like one-piece mounting clip having a fastener portion that is inserted into a panel hole and expanded into locking association with the hole from externally of the panel.

It is a further embodiment of the present invention to provide a molding clip having a novel wedge lock with supporting panel hole edges.

A further object of the invention is to provide a molding clip having an angularly projecting fixed tongue and a guided movable tongue both adapted to be inserted into a support panel hole to interlock with the hole edges.

A further object of the invention is to provide a novel sheet metal molding clip having an integral bendable locking tongue that passes through a special guide opening in a base and coacts with a relatively fixed tongue to functionally lock with the edges of a support aperture into which the tongues are inserted.

Further objects of the invention will appear as the description proceeds in connection with the appended claims and the annexed drawings wherein:

Figure 1 is a section on line 1—1 of Figure 2 showing a one-piece molding clip according to the preferred embodiment of the invention, with the movable locking tongue illustrated in normal retracted and inserted locking position in full and phantom lines respectively;

Figure 2 is a top plan view of the clip of Figure 1; and

Figure 3 is a bottom plan view of the clip of Figures 1 and 2.

In Figure 1 the automobile body side panel 11 is provided with an aligned series of small space circular holes 12 that extend generally perpendicular to the plane of the paper. This panel 11 is made of the usual gauge sheet steel so that it is quite rigid. A length of molding strip 13 is tightly secured along the exterior smooth surface of the panel by a series of molding clips 14, one at each hole 12. The molding clip 14 is preferably formed from a single piece of stiff but bendable malleable sheet metal and comprises a flat base 15 out of the plane of which the molding and panel mounting and engaging portions are struck and bent.

Along opposite longitudinal edges, the clip 14 is formed with angularly bent portions 16 and 17 that extend toward each other and fit within and frictionally engage the insides of the channel of the molding strip 13. The illustrated shape of the molding strip engaging portions 16 and 17 is not material to the invention as it may suit the molding strip cross-section shape. The essential requirement is that the fit between the molding strip and the clip permits longitudinal sliding of the strip with respect to clips secured to the panel as for mounting and removal, and that the frictional engagement between the clips and molding strip hold the strip tight against the panel without rattling and at the same time conceal the clips.

On the side opposite the molding strip, an integral tongue 18 is struck out of the base leaving an opening 19 and projecting at about forty-five degrees or so to the base. Between opening 19 and the molding strip engaging formation 17 a lip 21 is struck out of the base to project at about the same angle to the base as tongue 18 but divergently therefrom as illustrated, leaving an opening 22. Lip 21 is appreciably shorter than tongue 18 and as will appear its function is to serve as a guide for controlled insertion of the movable tongue 23. Also the angle of lip 21 may be easily preselected and altered at will by a mere bending operation for a purpose to appear.

The movable tongue 23 is cut or struck out of the base to leave a slot opening 24 and extends over the base and opening 19 and is formed with an angular end portion 25 that preferably extends nearly parallel to lip 21 and in its normal position in the completed but unassembled molding clip has its tip lying on guide lip 21 within opening 22 as shown in full lines in Figure 1.

This molding clip 14 is made from a stiff metal usually steel of such gauge as to be bendable to the required shape but to retain a given shape.

In use a series of the molding clips 14 are mounted in holes 12 along panel 11. Each clip is mounted in its associated hole by first inserting fixed tongue 18 into the hole and disposing the base 15 flat with the panel to the position shown in Figure 1. Then the worker by means of a simple conventional tool such as a hammer bends the movable tongue 23 toward the relatively flat position shown in phantom lines in Figure 1 and this projects the angular end portion 25 of the tongue with its tip guided by lip 21 through the hole 12. As it passes through hole 12 the movable tongue end frictionally engages the edges of hole 12 with a wedging action that also urges fixed tongue 18 tightly against the opposite edges of hole 12, and when tongue 23 reaches its extended phantom line position of Figure 1 its angular end portion 25 projects divergently from fixed tongue 18 with the tongues tightly frictionally lockingly engaging the opposite hole edges and the tendency of the tongue 23 to retain its given shape holding the base 15 flat and tight against panel 11. The optimum angles of the tongues is about 45° with a divergence of about 90° but this can be suited to conditions.

In practice the width of slot 22 is such that in passing through slot 22 the tongue 23 slidably guided by lip 21 on one side has any movement away from lip 21 limited by contact with the flat opposite edge of slot 22 so that angular entry of tongue 23 into the panel hole is positively controlled. Moreover, the looped shape of tongue 23 may be more or even less arcuate than illustrated, and as it enters hole 12 with one side sliding over lip 21 the other side is frictionally, heavily engaging the edge of hole 12 and in practice the tongue may be so deformed during such insertion through hole 12 that by the time tongue 23 reaches the dotted line position of Figure 1 it is tightly wedged and interlocked between lip 21 and the hole edge usually with the end 25 so bent that it provides positive latching action in addition to the wedge lock.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A fastening device made from a single piece of relatively stiff metal capable of retaining a given shape comprising a base having molding strip mounting structure thereon and means for mounting the device upon a relatively thin-walled supporting panel or the like having an aperture, comprising a first locking tongue projecting at an angle from said base and adapted to be inserted into and engage an edge of said aperture, a second locking tongue projecting through an opening in said base and adapted to be extended through said aperture at an angle with respect to said base divergently with respect to said first tongue, and an entry directing angularly disposed tongue guide lip on said base at said opening, said tongues being adapted to tightly frictionally engage opposed edges of said aperture to lock the device to said panel.

2. A fastening device made from a single piece of relatively stiff metal capable of retaining a given shape comprising a base having molding strip mounting structure thereon and means for mounting the device upon a relatively thin-walled supporting panel or the like having an aperture, comprising a first locking tongue projecting at an angle from said base and adapted to be inserted into and engage an edge of said aperture, and a looped second locking tongue reversely bent to extend along said base past said first tongue to project a free end portion thereof into an opening in said base and adapted to be substantially flattened against said base to project its free end portion through said aperture at an angle with respect to said base divergently with respect to said first tongue, said tongues being adapted to tightly frictionally engage opposite edges of said aperture to lock the device to said panel.

3. A fastening device made from a single piece of relatively stiff metal capable of retaining a given shape comprising a base having molding strip mounting structure thereon and means for mounting the device upon a relatively thin-walled supporting panel or the like having an aperture, comprising a first locking tongue projecting at an angle from said base and adapted to engage an edge of said aperture, a looped second locking tongue reversely bent to extend along said base and project an end portion into an opening in said base and adapted to be deformed toward said base for projecting said end portion through said aperture, and means at said opening for guiding and directing entry of said end portion into said aperture at an angle with respect to said base divergently with respect to said first tongue, said tongues tightly frictionally engaging the sides of said aperture to lock the device to said panel.

4. A fastening device made from a single piece of relatively stiff metal capable of retaining a given shape comprising a base having molding strip mounting structure thereon and means for mounting the device upon a relatively thin-walled supporting panel or the like having an aperture, comprising a first locking tongue projecting at an angle from said base and adapted to engage an edge of said aperture, a guide lip projecting from said base divergently with respect to said first tongue, and a second locking tongue on said base having an end portion projecting into an opening in said base adjacent said guide lip adapted to be thereby guided to pass into and through said aperture at an angle with respect to said base divergently with respect to said first tongue, said tongues being adapted to tightly frictionally engage opposed edges of said aperture to wedge lock the device to said panel.

5. The fastening device defined in claim 4, wherein said lip is bendably adjustable to select said angle.

6. A fastening device made from a single piece of relatively stiff metal capable of retaining a given shape comprising a base having molding strip mounting structure thereon and means for mounting the device upon a relatively thin-walled supporting panel or the like having an aperture, comprising a first locking tongue projecting at an angle from said base and adapted to engage an edge of said aperture, a guide lip projecting from said base along one edge of a narrow opening in said base and divergently with respect to said first tongue, and a second bendable locking tongue on said base having an end portion projecting into said opening in the base and adapted to be guided by said lip to pass through said aperture at an angle with respect to said base divergently with respect to said first tongue when the second tongue is bent toward said base, said tongues being adapted to tightly frictionally engage opposite edges of said aperture to lock the device to said panel.

7. A fastening device made from a single piece of relatively stiff metal capable of retaining a given shape comprising a base having molding strip mounting structure thereon and means for mounting the device upon a relatively thin-walled supporting panel or the like having an aperture, comprising a first locking tongue projecting at an angle from said base and adapted to engage one edge of said aperture, a second locking tongue made of a strip struck out of said piece of metal and bent into a loop disposed along said base with a free end portion projecting into an opening in said base and adapted to be extended through said aperture, and means on said base at said opening effective when said loop is deformed toward said base for guiding passage of said tongue end portion into said aperture and against an opposite edge of said aperture at an angle with respect to said base divergently with respect to said first tongue, said tongues being adapted to tightly frictionally engage the edges of said aperture to lock the device to said panel.

8. A fastening device made from a single piece of relatively stiff metal capable of retaining a given shape comprising a base having molding strip mounting structure thereon and means for mounting the device upon a relatively thin-walled supporting panel or the like having an aperture, comprising a first locking tongue projecting at an angle from said base and adapted to engage an edge of said aperture, a short guide lip struck out of said base and projecting from said base divergently with respect to said first tongue, said struck out lip thereby providing a narrow opening in said base, and a second locking tongue struck out of said piece looped over said base with a free end portion projecting into said opening in said base and being adapted to be extended through said aperture at an angle with respect to said base determined by said lip and divergently with respect to said first tongue when the looped portion is deformed toward said base, said tongues being adapted to tightly frictionally engage opposed edges of said aperture to lock the device to said panel.

9. A molding clip made of a single piece of sheet metal comprising a relatively flat base formed along opposite edges with molding support structure, a first tongue formed by metal struck out of said base to extend at an angle to said base, a guide lip also formed by metal struck out of said base and projecting angularly from said base divergently with respect to said first tongue, and a second tongue formed by a length of metal struck out of said piece and bent in a loop over the base to extend over the top of the opening in the base made by striking out said first tongue and having an end portion that is disposed in the opening made by striking out said lip, whereby when said first tongue is inserted into a panel or like mounting aperture in contact with an edge of said aperture and the base is disposed against the panel the second tongue loop may be deformed substantially flat against the base to thereby project the inner end of said second tongue angularly guided by said lip into frictional locking engagement with an opposite edge of said aperture.

References Cited in the file of this patent

UNITED STATES PATENTS

| | | |
|---|---|---|
| 2,168,721 | Tinnerman | Aug. 8, 1939 |
| 2,476,207 | Brown | July 12, 1949 |